(12) United States Patent
Kang (10) Patent No.: US 9,044,842 B2
(45) Date of Patent: Jun. 2, 2015

(54) ABRASIVE ARTICLE HAVING MULTI-DIRECTIONAL ABRASION PROTRUSION

(71) Applicant: DEERFOS CO., LTD., Incheon (KR)

(72) Inventor: Yeong-Gon Kang, Bucheon-si (KR)

(73) Assignee: DEERFOS CO., LTD., Incheon (KR)

( * ) Notice: Subject to any disclaimer, the term of this patent is extended or adjusted under 35 U.S.C. 154(b) by 170 days.

(21) Appl. No.: 13/845,220

(22) Filed: Mar. 18, 2013

(65) Prior Publication Data

US 2013/0280994 A1   Oct. 24, 2013

(30) Foreign Application Priority Data

Apr. 23, 2012   (KR) .................. 10-2012-0042266

(51) Int. Cl.
| | | |
|---|---|---|
| *B24D 3/00* | (2006.01) | |
| *B24D 11/00* | (2006.01) | |
| *B24B 37/26* | (2012.01) | |
| *B24D 13/14* | (2006.01) | |
| *B24D 15/00* | (2006.01) | |
| *B23D 71/00* | (2006.01) | |

(52) U.S. Cl.
CPC .............. *B24D 11/00* (2013.01); *B23D 71/00* (2013.01); *Y10T 407/1805* (2015.01); *B24B 37/26* (2013.01); *B24D 13/147* (2013.01); *B24D 2203/00* (2013.01)

(58) Field of Classification Search
USPC ............ 407/29.1, 29.11, 29.12, 29.13, 29.14
See application file for complete search history.

(56) References Cited

U.S. PATENT DOCUMENTS

| | | | | | |
|---|---|---|---|---|---|
| 289,104 | A | * | 11/1883 | How ........................... | 407/29.11 |
| 2,658,258 | A | * | 11/1953 | Hawkinson ................ | 407/29.11 |
| RE25,582 | E | * | 5/1964 | Davies ........................ | 407/29.11 |
| 4,028,781 | A | * | 6/1977 | Konrad ....................... | 407/29.11 |
| 4,625,725 | A | * | 12/1986 | Davison et al. ................. | 606/85 |
| 5,997,221 | A | * | 12/1999 | Sadler .......................... | 407/29.1 |
| 7,090,442 | B2 | * | 8/2006 | Ahrnkiel et al. ............ | 407/29.12 |

FOREIGN PATENT DOCUMENTS

| | | |
|---|---|---|
| KR | 1996-0704680 | 10/1996 |
| KR | 10-0216381 | 8/1999 |
| KR | 10-2000-0036021 | 6/2000 |
| KR | 10-0313263 | 12/2001 |
| KR | 10-2006-0087582 | 8/2006 |
| KR | 10-2010-0026786 | 3/2010 |
| WO | 95/07797 | 3/1995 |

* cited by examiner

*Primary Examiner* — Will Fridie, Jr.
(74) *Attorney, Agent, or Firm* — Lexyoume IP Meister, PLLC (57) ABSTRACT

According to this constitution, loading resistance and durability are excellent, there are no attachment materials attached to an abraded surface in the case where a flat surface is abraded, abrasion can be efficiently and evenly performed in a predetermined shape even though abrasion particles are not enlarged to perform abrasion or abrasion is not repeated several times by using particulates, and abrasion performance can be improved.

10 Claims, 13 Drawing Sheets

ABRASIVE ARTICLE HAVING MULTI-DIRECTIONAL ABRASION PROTRUSION

CROSS-REFERENCE TO RELATED APPLICATION

This application claims priority to and the benefit of Korean Patent Application No. 10-2012-0042266 filed in the Korean Intellectual Property Office on Apr. 23, 2012, the entire contents of which are incorporated herein by reference.

BACKGROUND OF THE INVENTION (a) Field of the Invention

The present invention relates to an abrasive article having a multi-directional abrasion protrusion, and more particularly, to an abrasive article having a multi-directional abrasion protrusion, in which grinding performance is improved by providing various directional properties to an abrasion protrusion pattern (the degree of freedom is increased).

(b) Description of the Related Art

Recently, an abrasion method using fluidic abrasion slurry has been replaced with a solid abrasive article because problems that a large amount of slurry is required, separate equipment for agitation, treatment, discarding, and the like is required to manufacture slurry with a uniform concentration, and the abrasion method is not environmentally-friendly have been on the rise.

However, the solid abrasive article has problems in that defects or flaws may remain which does not provide predetermined transparency to articles such as glass and progress traces and the like remain during abrasion, and particularly, a problem in that a lot of time is required in order to obtain a predetermined effect as compared to the fluidic abrasion slurry.

Figure 1A:
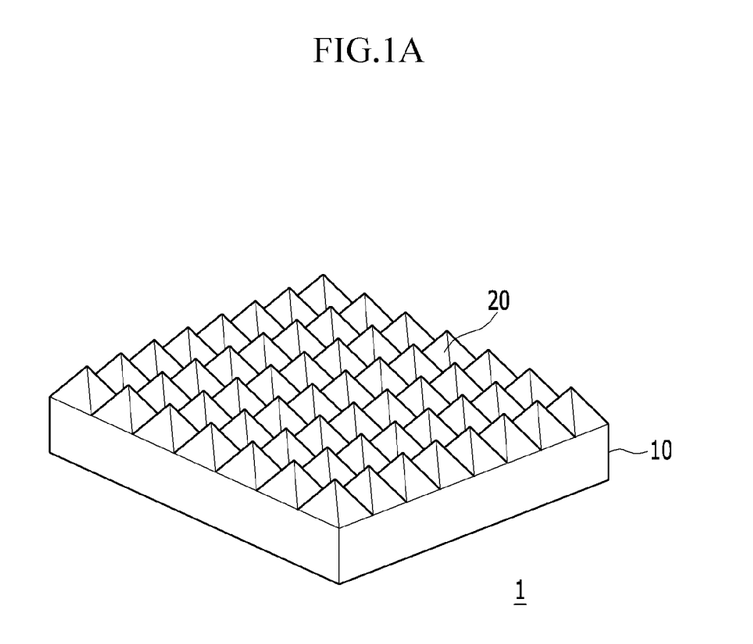
FIG. 1A is a perspective view of a general abrasive article.

As illustrated in FIG. 1A, a ultraprecision finishing abrasive article 1 formed of a solid, in which abrasion protrusions 20 having a predetermined 3D structure shape are uniformly applied on a surface of a substrate 10, is used in order to solve the problems.

Figure 1B:
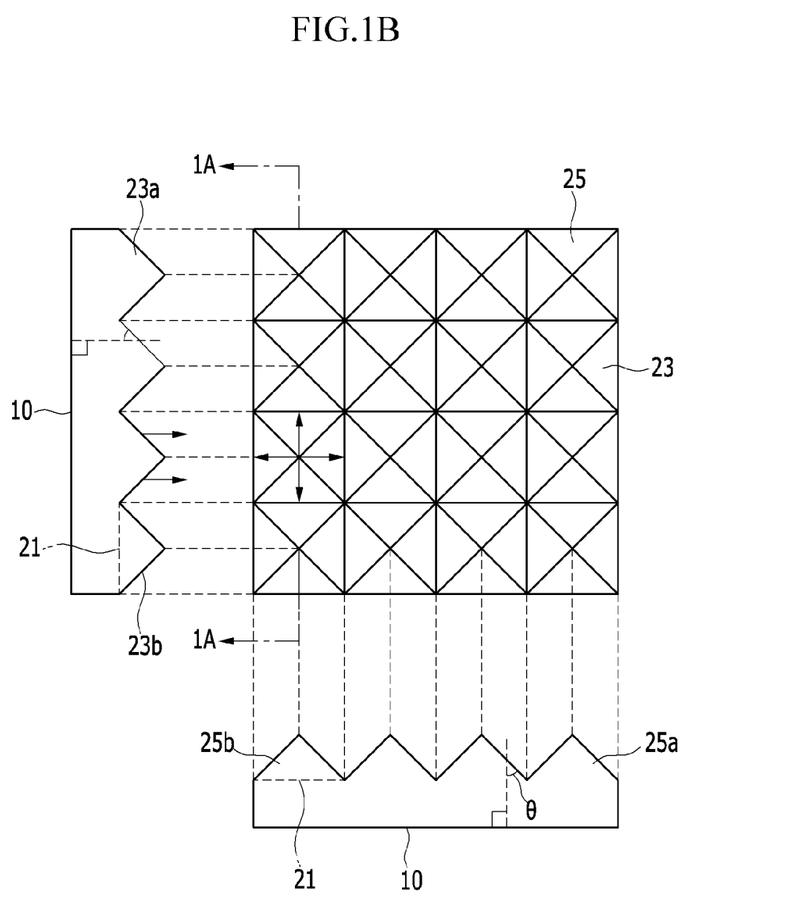
FIG. 1B is a top plan view of FIG. 1A.

However, it can be seen that in the solid abrasive article, as illustrated in FIG. 1B, in the case where the abrasion protrusion 20 has a quadrangular pyramid shape where a base portion 21 is quadrangular, when abrasion is performed in a direction (arrow direction) that is vertical to lateral sides 23 and 25 of a triangle extending from each base portion 21, since the largest areas 23a and 25a and slopes 23b and 25b are ensured, abrasion performance is best.

There are problems in that since the abrasion protrusions 20 are formed of abrasion particles at a minute level, abrasion dust collects between the abrasion protrusions 20 after abrasion, and since liquid used as a coolant and a lubricant does not sufficiently fulfill a function between the abrasion protrusions and a glass board, a portion of an abrasion material forming the abrasion protrusions is attached to a surface of the glass board after abrasion and abrasion performance is rapidly reduced.

A way to space the abrasion protrusion 20 and the abrasion protrusion 20 apart from each other is proposed in order to solve the problems.

However, in this case, there are problems in that a density of the abrasion protrusion 20 on a substrate is reduced to reduce grinding performance by a reduction in density, and in the case where a form of a general abrasive article, for example, an abrasion tape, is used, if considering that the form is used by performing rotation in one direction, many spaces where abrasion is not performed are formed.

Further, in the case where the abrasion material is attached to a surface of a body to be ground, washing or abrasion is performed while pushing with strong force is performed in a final finishing step, but there is a problem in that the abrasion material cannot be removed by uniform abrasion protrusions 20 having a constant size, and thus abrasion is repeated several times by the abrasive article 1 having larger abrasion protrusions 20.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an abrasive article having a multi-directional abrasion protrusion, in which loading resistance and durability are excellent, there are no attachment materials attached to an abraded surface in the case where a flat surface is abraded, abrasion is efficiently and evenly performed in a predetermined shape even though abrasion particles are not enlarged to perform abrasion or abrasion is not repeated several times by using particulates, and abrasion performance is improved.

An exemplary embodiment of the present invention provides an abrasive article having a multi-directional abrasion protrusion including: a flexible base substrate, and a plurality of abrasion protrusions integrally molded with the base substrate and having at least three sides forming a triangle.

A plurality of abrasion protrusions has a directional property by grouping.

According to an exemplary embodiment of the present invention, it is possible to provide an abrasive article having a multi-directional abrasion protrusion, in which loading resistance and durability are excellent, there are no attachment materials attached to an abraded surface in the case where a flat surface is abraded, abrasion can be efficiently and evenly performed in a predetermined shape even though abrasion particles are not enlarged to perform abrasion or abrasion is not repeated several times by using particulates, and abrasion performance is improved.

DETAILED DESCRIPTION OF THE EMBODIMENTS

Preferable exemplary embodiments of the present invention will be described in more detail with reference to the accompanying drawings, but a known technology portion will be omitted or compressed for briefness of the description.

Figure 2A:
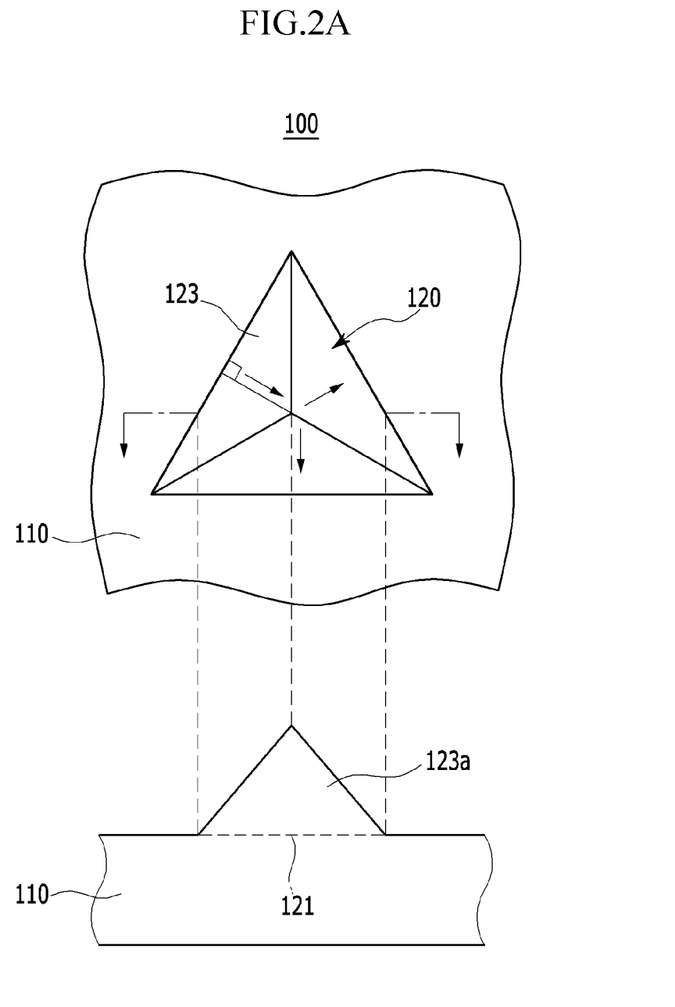
FIG. 2A is a top plan view of an abrasion protrusion of an abrasive article according to an exemplary embodiment of the present invention.
Figure 2B:
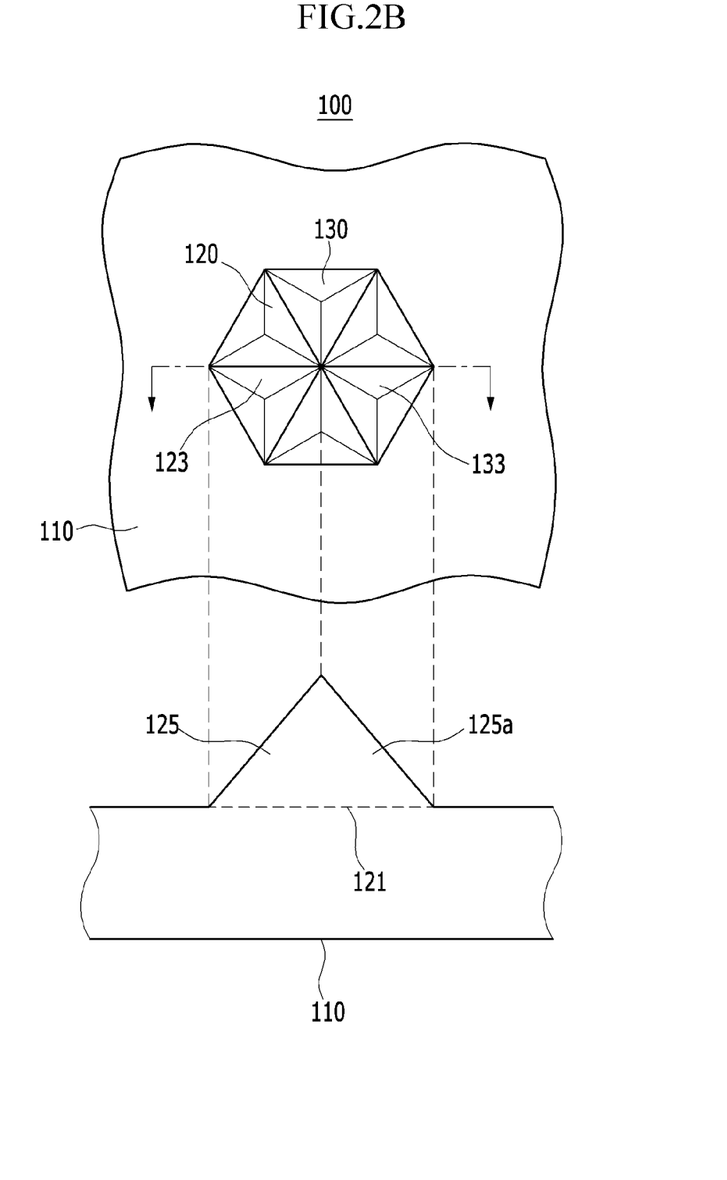
FIG. 2B is a top plan view of a grouped abrasion protrusion of the abrasive article according to the exemplary embodiment of the present invention.
Figure 3:
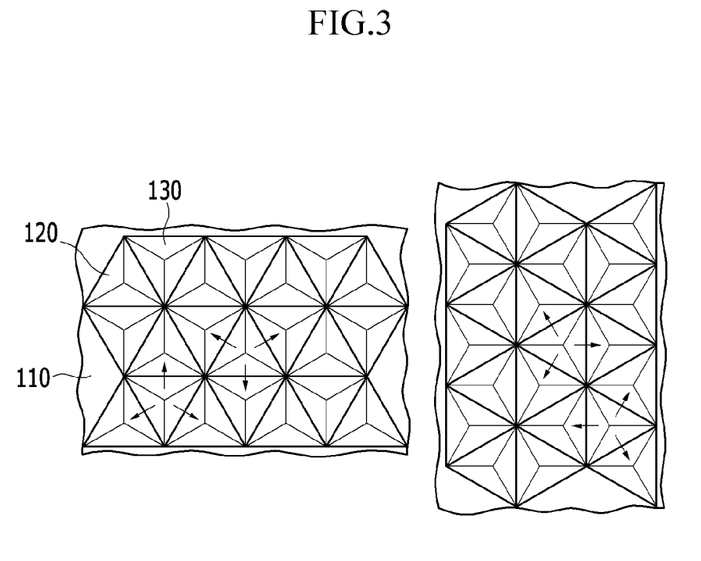
FIG. 3 is a top plan view of the abrasive article according to the exemplary embodiment of the present invention.
Figure 4:
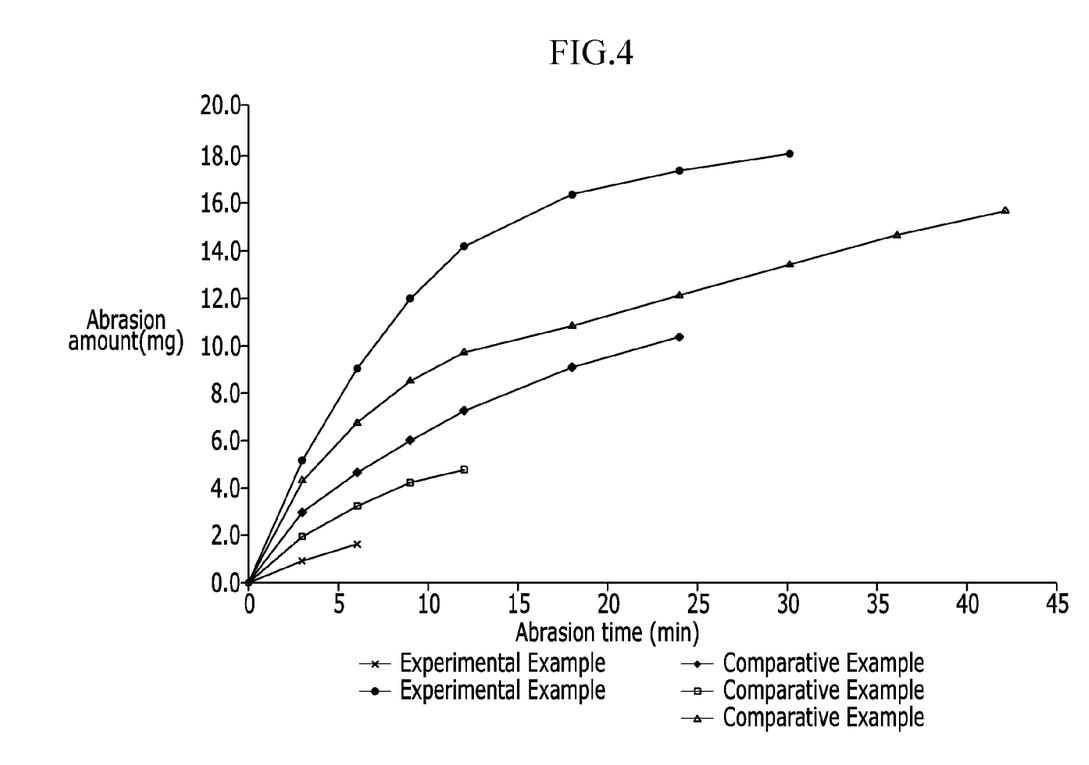
FIG. 4 is a graph comparing an abrasion amount of the abrasive article according to the exemplary embodiment of the present invention and an abrasion amount of an abrasive article in the related art.

FIG. 2A is a top plan view of an abrasion protrusion of an abrasive article according to an exemplary embodiment of the present invention, FIG. 2B is a top plan view of a grouped abrasion protrusion of the abrasive article according to the exemplary embodiment of the present invention, FIG. 3 is a top plan view of the abrasive article according to the exemplary embodiment of the present invention, and FIG. 4 is a graph comparing an abrasion amount of the abrasive article according to the exemplary embodiment of the present invention and an abrasion amount of an abrasive article in the related art.

Referring to FIG. 2A, an abrasion protrusion 120 uniformly applied on a surface of an abrasion substrate 110 of an abrasive article 100 according to the exemplary embodiment of the present invention may be integrally formed with the abrasion substrate 110, and may be formed of a tetrahedron having four sides forming a triangle.

An abrasion particle typically has a particle size in the range of about 0.1 to 1500 µm, and includes molten aluminum oxide including brown aluminum oxide, heat treated aluminum oxide, and white aluminum oxide, ceramic aluminum oxide, green silicon carbide, silicon carbide, chromia, alumina zirconia, diamond, iron oxide, ceria, cube boron nitride, boron carbide, garnet, and a combination thereof.

The term "abrasion particle" means that single abrasion particles are bound to each other to form the abrasion protrusion, and the abrasion particles are dispersed in an organic binding agent to form the abrasion protrusion. The binding agent is induced from a binding agent precursor including an organic polymerizable resin.

When the abrasive article of the present invention is manufactured, the binding agent precursor is exposed to an energy source helping initiation of a polymerization or curing process. Examples of the energy source include heat energy and radiation energy, and the latter includes an electronic beam, ultraviolet rays, and visible rays. A resin is polymerized to be converted into the binding agent where the binding agent precursor is agglomerated during the polymerization process. Abrasion coating is formed when the binding agent precursor is agglomerated.

Typical and favorable examples of the organic resin include a phenollic resin, a urea-formaldehyde resin, a melamine formaldehyde resin, acrylated urethane, acrylated epoxy, an ethylene unsaturated compound, an aminoplaste derivative having a branched unsaturated carbonyl group, an isocyanurate derivative having at least one branched acrylate group, an isocyanate derivative having at least one branched acrylate group, vinyl ether, an epoxy resin, and a mixture and a combination thereof.

A grinding aid may be added to improve chemical and physical characteristics of the abrasive article, and particularly, the grinding aid may be used to 1) improve friction between the abrasion particles and operation workpieces to be abraded, 2) prevent the abrasion particle from being "capped", that is, prevent metal particles from being welded to upper portions of the abrasion particles (in the case of the metal workpieces), 3) reduce an interface temperature between the abrasion particles and the workpieces, 4) reduce required grinding force, or 5) prevent the metal workpieces from being oxidized, thus increasing a use life-span of the abrasive article.

A selective additive such as a filler, fibers, a lubricant, a wetting agent, a thixotropic material, a surfactant, a dye, a pigment, an antistatic agent, a coupling agent, a plasticizer, and a suspending agent may be further included. The amount of the aforementioned materials is selected so as to provide a desired characteristic. The use thereof may affect corrosivity of the abrasion protrusion. In some cases, the additive may serve to much well corrode the abrasion protrusion, thus discharging blunt abrasion particles and exposing new abrasion particles.

As illustrated in FIG. 2A, the base portion 121 of the abrasion protrusion 120 may have three sides or four sides, and is constituted by three sides in the exemplary embodiment of the present invention, and is constituted so that a lateral side 123 of the abrasion protrusion 120 is gradually reduced in a height direction.

If the abrasion protrusion 120 is constituted by the tetrahedron, when a body to be ground is positioned at the corner of the abrasion protrusion 120 during grinding, largest pressure is provided at an angle at which grinding efficiency is highest, herein, at a right angle to each side to perform abrasion well, and thus highest grinding efficiency or washing efficiency may be exhibited.

Three angles at which grinding efficiency is high, for example, 55°, 172.5°, and 297.5° based on one corner may be provided to one abrasion protrusion 120.

Further, the side of the abrasion protrusion 120 may be constituted to be gradually reduced in a height direction, thus providing a secondary abrasion protrusion along the non-uniform abrasion side and more easily releasing the abrasion protrusion from a manufacturing tool when the abrasive article 100 as described later is manufactured.

Meanwhile, as illustrated in FIG. 2B, the abrasive article 100 according to the exemplary embodiment of the present invention may have a multi-directional property by grouping a plurality of abrasion protrusions 120, 130 . . . , for example, six abrasion protrusions 120, 130 . . . to constitute a hexahedron.

In this case, a more larger cross-sectional area 125a may be provided by two lateral sides 123 and 133 when the first abrasion protrusion 120 and the second abrasion protrusion 130 are grouped and abrasion is performed in one direction using the hexahedron by the grouped abrasion protrusion 120, as compared to a cross-sectional area 123A used to perform abrasion in a direction that is vertical to one lateral side 123 of the abrasion protrusion 120 by one abrasion protrusion 120.

Accordingly, two or more different abrasion sides may be provided by using one abrasive article to obtain an effect of using two or more different abrasive articles, increase abrasion performance, and rapidly perform abrasion as compared to the related art.

Meanwhile, according to the exemplary embodiment of the present invention, as illustrated in FIG. 3, six angles at which grinding efficiency is high, for example, 55°, 172.5°, 297.5°, 235°, 352.5°, and 117.5° at which grinding or washing efficiency is highest based on one corner, may be provided by arranging the tetrahedral abrasion protrusions 120 in a forward direction so as to allow the abrasion protrusions to be adjacent to each other, and repeatedly disposing the tetrahedral abrasion protrusions 130 disposed in a backward direction between the adjacent tetrahedral abrasion protrusions 120.

That is, abrasion may be performed in almost all directions by the abrasive article 100 having the grouped first and second abrasion protrusions 120 and 130 even though a separate abrasive article is not used in order to remove defects and the like formed during abrasion, and, generally, if there may be at least five separate abrasion protrusions per cm$^2$, at least ten abrasion protrusions may be provided per cm$^2$ according to the exemplary embodiment of the present invention, and thus grinding efficiency may be increased as compared to the related art.

Further, it can be seen that in the first abrasion protrusion 120 abraded in one direction, since a space in which abrasion is not performed may occur, surface defects of the body to be ground cannot be removed or grinding traces may remain, but a more flat surface may be obtained by performing removal by the second abrasion protrusion 130 disposed in a backward direction, thus removing the surface defects of the body to be ground and the grinding traces.

Further, a multi-directional property may be further provided by rotating the grouped abrasion protrusions 120 and 130 at 90° in one direction and placing the abrasion protrusions end to end.

As illustrated in FIG. 4, it can be seen that an abrasion time of about 7 mins and up to 15 mins is required to abrade the body having the size of 50 cm×50 cm to be ground by the abrasive article according to the exemplary embodiment of the present invention while about 25 mins or more are required to abrade the same body to be ground by an abrasive article in the related art in order to provide the abrasion side under the same condition through a microscope, and thus abrasion efficiency of two times or more is ensured.

Now, an abrasive article according to another exemplary embodiment of the present invention will be described in detail with reference to FIGS. 5 to 9.

Figure 5:
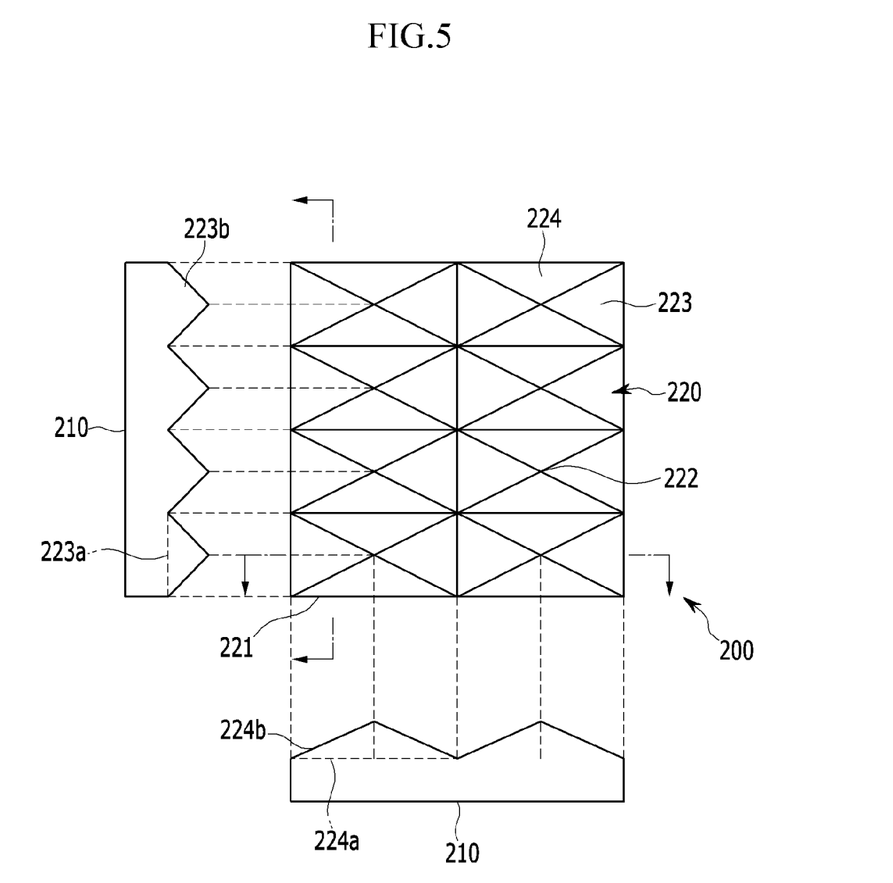
FIG. 5 is a top plan view of an abrasive article according to a modified exemplary embodiment of the present invention.
Figure 6:
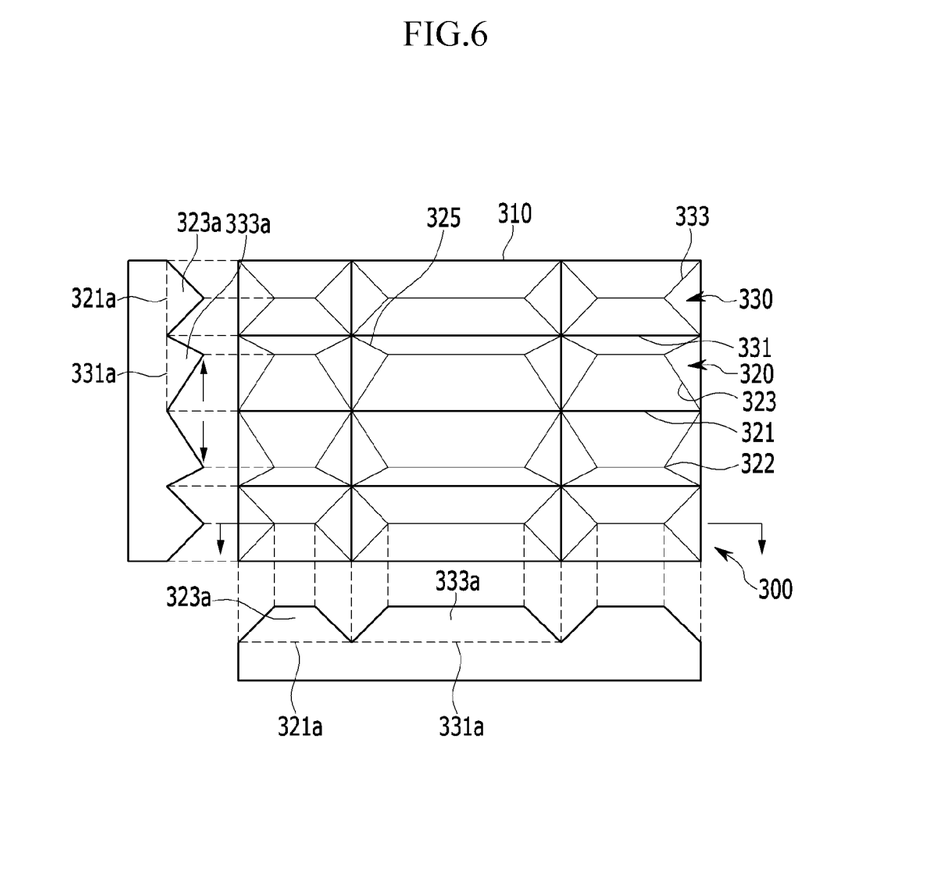
FIG. 6 is a top plan view of an abrasive article according to another modified exemplary embodiment of the present invention.
Figure 7A:
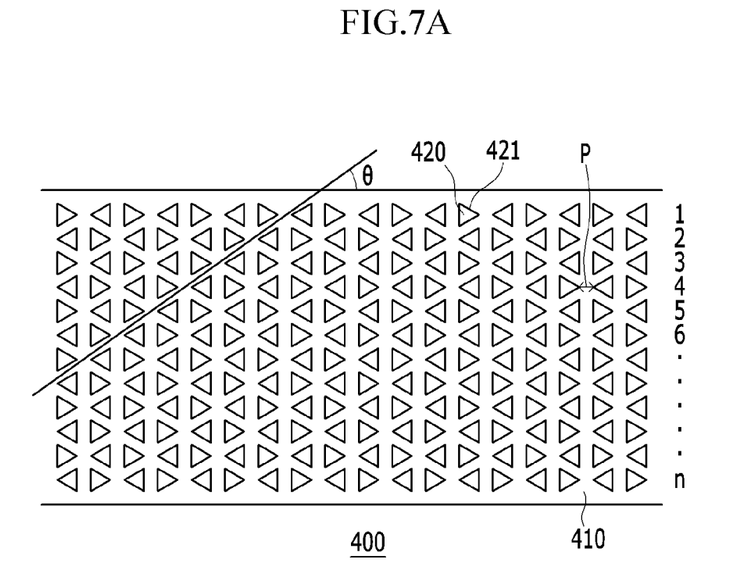
FIGS. 7A and 7B are top plan views of an abrasive article according to yet another modified exemplary embodiment of the present invention.
Figure 7B:
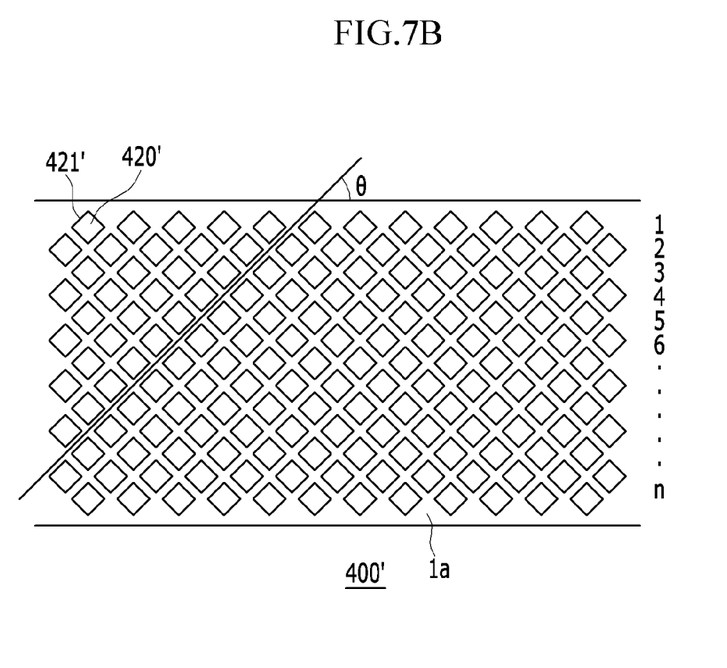
Figure 8A:
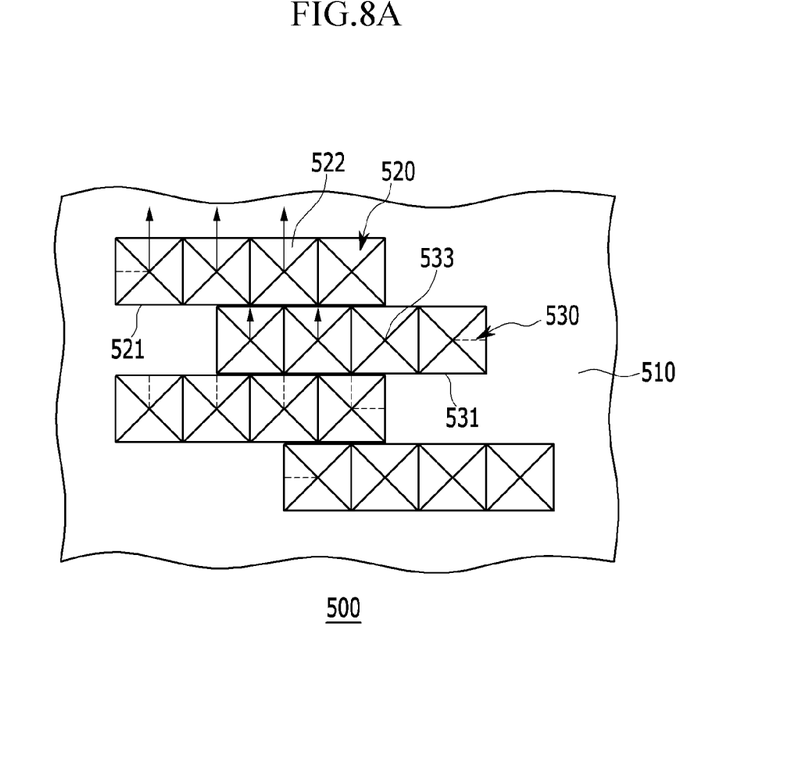
FIGS. 8A and 8B are top plan views of an abrasive article according to still another modified exemplary embodiment of the present invention.
Figure 8B:
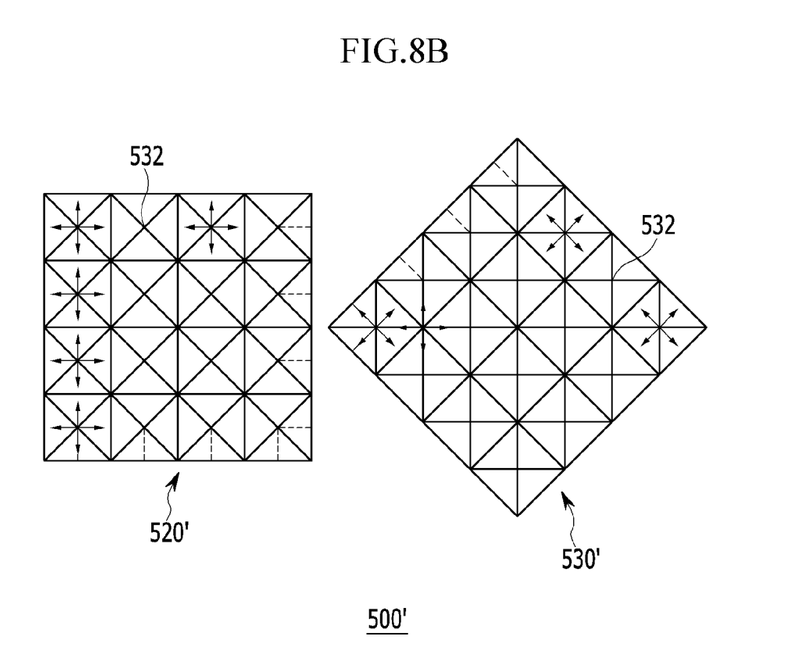

FIG. 5 is a top plan view of an abrasive article according to a modified exemplary embodiment of the present invention, FIG. 6 is a top plan view of an abrasive article according to another modified exemplary embodiment of the present invention, FIG. 7 is a top plan view of an abrasive article according to yet another modified exemplary embodiment of the present invention, and FIG. 8 is a top plan view of an abrasive article according to still another modified exemplary embodiment of the present invention.

It can be seen that all abrasive articles provide an increased initial cutting rate (measured by a mass per a cycle), the cutting rate minimally deteriorates in each continuous abrasion cycle, and grinding efficiency is increased as compared to the related art.

The abrasion protrusion illustrated in FIGS. 5 to 8 may be manufactured by the same method of manufacturing the abrasive article as described below, and since the abrasion particle and the binding agent can be used like the related art, a detailed description thereof will be omitted.

As illustrated in FIG. 5, an abrasion protrusion 220 according to the exemplary embodiment of the present invention has a rectangular base portion 221, and four lateral sides 223 and 224 extending from four lateral sides of the base portion 221 to a vertex 222.

Since lateral sides 223*a* and 224*a* of the base portion 221 have different lengths, the abrasion protrusion 220 according to the exemplary embodiment of the present invention may have a first flat side 223*a* in a direction that is vertical to the first lateral side 223 in a first direction and a second flat side 224*a* in a direction that is vertical to the second lateral side 224 in a second direction to increase the multi-directional property or the degree of freedom by one abrasive article, thus obtaining an effect of two abrasive articles.

As illustrated in FIG. 6, an abrasive article 300 according to another exemplary embodiment of the present invention is constituted by disposing a hexagonal base portion 321, a first abrasion protrusion 320 having six lateral sides 323 and 325 extending from six lateral sides 321*a* of the base portion 321 to vertexes 322, and a second abrasion protrusion 330 including any one of the six lateral sides 321*a* of the base portion 321 of the first abrasion protrusion 320, in which lengths of the residual lateral sides are different from a length of any one of the six lateral sides of the base portion 321 of the first abrasion protrusion 320, to connect the first abrasion protrusion and the second abrasion protrusion to each other.

Since at least two of the lateral sides of the base portion 321 have different lengths, the abrasive article 300 according to the exemplary embodiment of the present invention may have a plurality of first flat sides 323*a* having different abrasion sides in a direction that is vertical to a first lateral side 323 in a first direction and a plurality of second flat sides 333*a* having different areas of the abrasion sides in a direction that is vertical to a second lateral side 333 in a second direction to increase the multi-directional property or the degree of freedom by one abrasive article, thus obtaining an effect of at least two or more abrasive articles.

As illustrated in FIG. 7A, an abrasive article 400 according to a modified exemplary embodiment of the present invention may provide a multi-directional property by, in an abrasion protrusion 420 where base portions 421 are triangles having the same area, disposing an n-th abrasion protrusion in a forward direction and an n+1-th abrasion protrusion in a backward direction in an n-th column, and disposing directions of the n-th abrasion protrusions of the n-th column and an n+1-th column to allow the directions to be symmetrical to each other.

In this case, a plurality of abrasion protrusions 420 may be spaced apart from each other by a pitch p, and it is preferable that the pitch be set so that an area of the base portion 421 of the abrasion protrusion 420 is 90% or more based on an entire area of the abrasive article in order to increase abrasion efficiency.

As illustrated in FIG. 7B, an abrasive article 400' according to a modified exemplary embodiment of the present invention may provide a multi-directional property to the abrasive article 400 by, in an abrasion protrusion 420' where base portions 421' are squares having the same area, rotating the square abrasion protrusion 420' at 90° to dispose the abrasion protrusion in an n-th column and rotating the square abrasion protrusion 420' at 90° to dispose the abrasion protrusion in an n+1-th column so that a first lateral side of an n-th abrasion protrusion of the n-th column faces three n-th lateral sides of the n+1-th column, thus offsetting the abrasion protrusion of the n-th column and the abrasion protrusion of the n+1-th column. According to this constitution, when the abrasion protrusion of the n-th column is abraded in one direction by the abrasive article 400', grinding efficiency may be increased by removing abrasion traces occurring in the body to be ground by the abrasion protrusion of the n+1-th column.

In this case, a plurality of abrasion protrusions 420' may be spaced apart from each other by a pitch p, and it is preferable that the pitch be set so that an area of the base portion 421' of the abrasion protrusion 420' is 90% or more based on an entire area of the abrasive article in order to increase abrasion efficiency and increase a loading deterioration property.

Referring to FIG. 8A, an abrasive article 500 according to another exemplary embodiment of the present invention may increase grinding efficiency by, in the case where an abrasion protrusion 520 having a square base portion 521 is arranged in an n-th column, constituting an n-th abrasion protrusion 530 of an n+1-th column to be offset to the n-th abrasion protrusion 520 of the n-th column, and preferably disposing the n-th abrasion protrusion 530 of the n+1-th column to start on a perpendicular line of the n-th abrasion protrusion 520 of the n-th column, thus removing abrasion traces occurring in the body to be ground when the abrasion protrusion of the n-th column is abraded by the abrasion protrusion of the n+1-th column. Vertexes 522 and 532 of the first abrasion protrusion 520 and the second abrasion protrusion 530 are constituted to form a zigzag pattern.

As illustrated in FIG. 8B, an abrasive article 500' according to another exemplary embodiment of the present invention may provide a multi-directional property by continuously disposing a first grouped abrasion protrusion 520' and a second grouped abrasion protrusion 530'.

Figure 9:
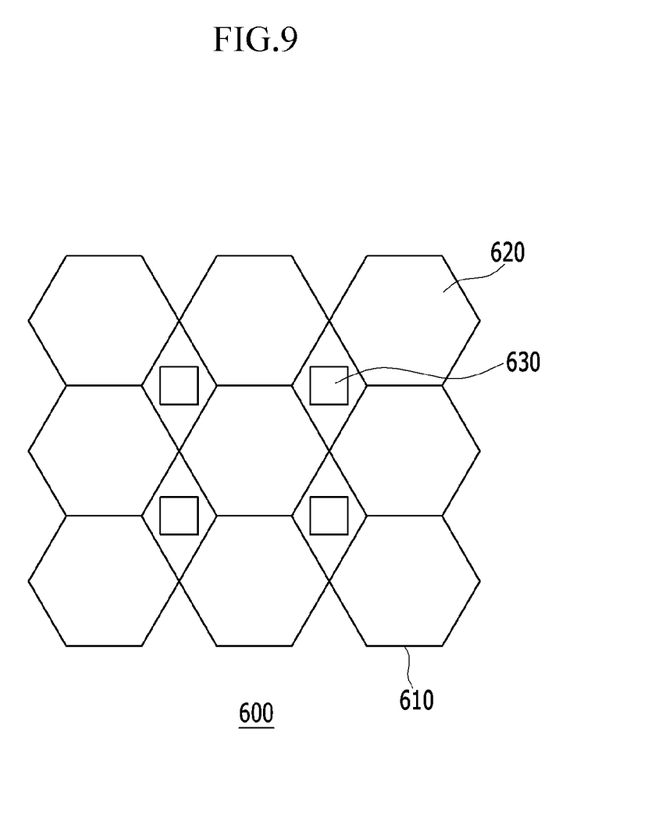
FIG. 9 is a top plan view of an abrasive article according to a further modified exemplary embodiment of the present invention.

Referring to FIG. 9, an abrasive article 600 according to another exemplary embodiment of the present invention is constituted by disposing a first abrasion protrusion 620 having at least one of a first shape, a first surface area, and a first directional property, and a second abrasion protrusion 630 having at least one of a second shape, a second surface area, and a second directional property to be grouped.

In this case, a plurality of abrasion protrusions 620 and 630 may be spaced apart from each other by a pitch p, and it is preferable that the pitch be set so that an area of base portions 610 of the abrasion protrusions 620 and 630 is 90% or more based on an entire area of the abrasive article in order to increase abrasion efficiency and increase a loading deterioration property.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS 100, 200, 300, 400, 500, 600: Abrasive article
110, 210, 310, 410, 510, 610: Base portion
120, 130, 220, 230, 320, 330, 420, 520, 620, 630: Abrasion protrusion

What is claimed is:
1. An abrasive article having a multi-directional abrasion protrusion comprising:
a flexible base substrate, and
a plurality of abrasion protrusions integrally molded with the base substrate and having at least three sides forming a triangle,
wherein the plurality of abrasion protrusions has a directional property by grouping,
wherein a hexagonal base portion, a first abrasion protrusion having six lateral sides extending from six lateral sides of the base portion to vertexes, and a second abrasion protrusion including any one of the six lateral sides of the base portion of the first abrasion protrusion, in which lengths of the residual lateral sides are different from a length of any one of the six lateral sides of the base portion of the first abrasion protrusion, are disposed to be connected to each other.

2. The abrasive article having a multi-directional abrasion protrusion of claim 1, wherein:
in the case where the abrasion protrusions are a tetrahedron, the abrasion protrusions include a first abrasion protrusion arranged in a first direction and a second abrasion protrusion arranged in a direction that is opposite to at least the first direction.

3. The abrasive article having a multi-directional abrasion protrusion of claim 2, wherein:
six abrasion protrusions are grouped to constitute a hexahedron.

4. The abrasive article having a multi-directional abrasion protrusion of claim 1, wherein:
in the case where the abrasion protrusion has a rectangle base portion and four lateral sides extending from four lateral sides of the base portion to vertexes, the lateral sides of the base portion have different lengths.

5. The abrasive article having a multi-directional abrasion protrusion of claim 1, wherein:
in the case where the base portion of the abrasion protrusion is triangular, an n-th abrasion protrusion is disposed in a forward direction and an n+1-th abrasion protrusion is disposed in a backward direction in an n-th column, and directions of the n-th abrasion protrusions of the n-th column and an n+1-th column are disposed to be symmetrical to each other.

6. The abrasive article having a multi-directional abrasion protrusion of claim 1, wherein:
in the case where the base portion of the abrasion protrusion is square, the abrasion protrusion is rotated at 90° and disposed in an n-th column and the square abrasion protrusion is rotated at 90° and disposed in an n+1-th column so that a first lateral side of an n-th abrasion protrusion of the n-th column faces three n-th lateral sides of the n+1-th column, thus offsetting the abrasion protrusion of the n-th column and the abrasion protrusion of the n+1-th column.

7. The abrasive article having a multi-directional abrasion protrusion of claim 1, wherein:
in the case where the base portion of the abrasion protrusion is square, an n-th abrasion protrusion of an n+1-th column is disposed on a perpendicular line of a first lateral side of the n-th abrasion protrusion of an n-th column.

8. The abrasive article having a multi-directional abrasion protrusion of claim 1, wherein:
a first grouped abrasion protrusion and a second grouped abrasion protrusion are continuously disposed.

9. The abrasive article having a multi-directional abrasion protrusion of claim 1, wherein:
a first abrasion protrusion having at least one of a first shape, a first surface area, and a first directional property, and a second abrasion protrusion having at least one of a second shape, a second surface area, and a second directional property are disposed to be grouped.

10. The abrasive article having a multi-directional abrasion protrusion of claim 1, wherein:
the abrasion protrusions are spaced apart from each other by a pitch and the pitch is set so that an area of the base portion of the abrasion protrusion is 90% or more based on an entire area of the abrasive article.

* * * * *